United States Patent [19] [11] 3,878,335

Balaban [45] Apr. 15, 1975

[54] DIGITAL SYNCHRONIZATION SYSTEM

[75] Inventor: Alvin Reuben Balaban, Raritan, N.J.

[73] Assignee: RCA Corporation, New York, N.Y.

[22] Filed: Oct. 18, 1973

[21] Appl. No.: 407,696

[52] U.S. Cl. .............................. 178/69.5 TV; 328/63
[51] Int. Cl. .............................................. H04m 5/06
[58] Field of Search ..... 178/69.5 TV, 69.5 R, 7.3 S, 178/7.3 R, 7.5 R, 7.5 S; 179/15 BS; 328/63

[56] References Cited

UNITED STATES PATENTS

| | | | |
|---|---|---|---|
| 3,311,701 | 3/1967 | Lynch | 178/69.5 TV |
| 3,530,238 | 9/1970 | Matarese | 178/69.5 TV |
| 3,688,037 | 8/1972 | Ipri | 178/69.5 TV |
| 3,691,297 | 9/1972 | Merrell et al. | 328/63 |
| 3,751,588 | 8/1973 | Eckenbrecht et al. | 178/69.5 TV |

*Primary Examiner*—Charles E. Atkinson
*Assistant Examiner*—Errol A. Krass
*Attorney, Agent, or Firm*—Eugene M. Whitacre; Paul J. Rasmussen

[57] ABSTRACT

A digital vertical deflection rate synchronization system includes a source of clock pulses which drives a divide-by-525 counter and a serial-to-parallel shift register. An incoming low frequency signal such as that obtained from the sync separator stage of a television receiver is scanned at the clock rate to determine whether it exhibits the width characteristic of the vertical sync signal. If the incoming signal does not, the vertical deflection sawtooth generator is synchronized by a pulse derived from the divide-by-525 counter. If the incoming signal does exhibit the vertical sync pulse width characteristic, it is allowed to reset the divide-by-525 counter. In the event that the divide-by-525 counter is reset before it has passed a synchronizing pulse to the vertical deflection sawtooth generator, an overscan limit control circuit senses the collapsing vertical deflection yoke field and creates a vertical deflection synchronizing pulse.

11 Claims, 18 Drawing Figures

DIGITAL SYNCHRONIZATION SYSTEM

BACKGROUND OF THE INVENTION

The present invention relates to an improved deflection synchronizing system for a television receiver.

In most modern television receiver systems vertical deflection synchronization is acheived by injection locking a 60 Hertz vertical rate oscillator, i.e., driving the oscillator with the received vertical deflection synchronizing pulses. Thus, the receiver vertical deflection phase is established independently of the receiver horizontal deflection system. However, spurious noise pulses and other types of signal degradation may be introduced into the vertical sync signal causing the vertical oscillator to lose synchronization. The viewer will see the effects of non-synchronous operation as flicker or jitter of the kinescope display. In extreme cases the vertical sync signal may be obliterated by noise pulses and the annoying phenomenon known as "roll" will occur in the kinescope display, rendering it unviewable.

It would be desirable to provide a vertical deflection synchronization system which would provide vertical sync pulses which are locked to the correct frequency by insuring that they are in the correct time relationship to the horizontal sync pulses even in the presence of noise which may accompany the received composite television signal. Such a system could be made to insure proper receiver operation even in the absence of received vertical sync pulses. It would also be desirable to provide a vertical deflection sync system which would continuously scan the incoming composite video signal for vertical sync information.

SUMMARY OF THE INVENTION

In accordance with the present invention, a digital synchronizing system includes a first source of synchronizing pulses and a second source of synchronizing pulses which are subject to degradation. Resettable counting means are coupled to the first source of synchronizing pulses for counting pulses generated in the first source of synchronizing pulses and for generating a first reset pulse upon the counting of a constant number of pulses from the first source of synchronizing pulses. Converting means are coupled to the first source of synchronizing pulses and to the second source of synchronizing pulses for sampling the voltage level of pulses generated by the second source of synchronizing pulses at a rate determined by the rate of the first source of synchronizing pulses and for storing information representative of the sampled voltage level. Gating means are coupled to the converting means for monitoring the stored information in the converting means and for generating a second reset pulse when the stored information corresponds to a pulse having time duration characteristics of pulse components of the second source of synchronizing pulses. Resetting means are coupled to the gating means and to the resettable counting means for resetting the resettable counting means upon the incidence of either one or both of the first and second reset pulses. A load circuit is coupled to the resettable counting means and the operation of the load circuit is synchronized by the occurrence of a pulse generated therein.

The present invention can best be understood by referring to the following description and accompanying figures of which:

DESCRIPTION OF THE INVENTION

Figure 1:
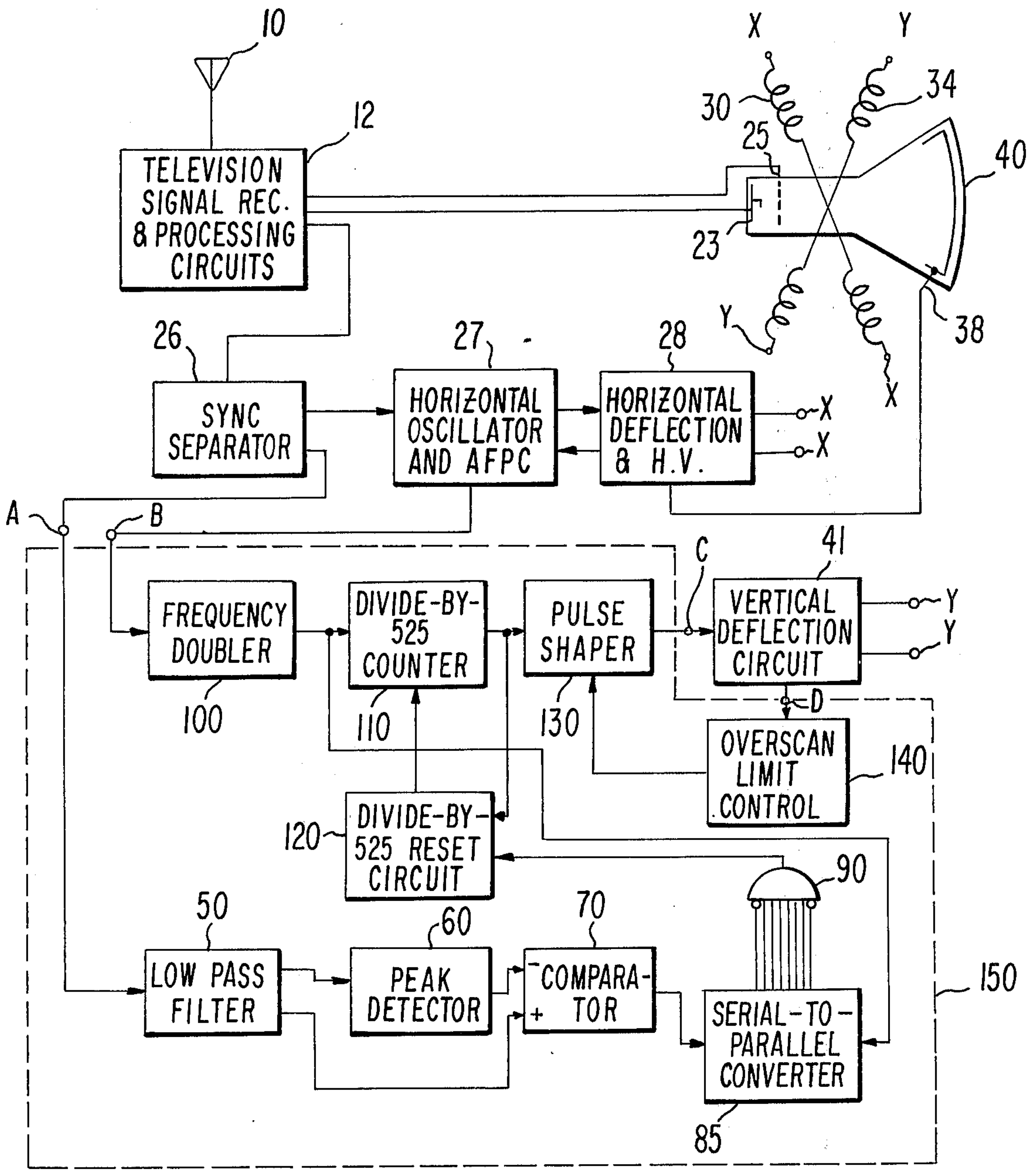
FIG. 1 is a block diagram of a color television receiver incorporating a synchronizing system embodying the present invention.

In the circuit of FIG. 1 an antenna 10 for receiving television signals is coupled to television signal receiving and processing circuits 12 including such conventional components as a tuner, an intermediate frequency amplifier, video detectors, audio signal processing circuits, a video amplifier, an automatic gain control circuit, and chrominance circuits in a color television receiver. Output terminals of circuit 12 are connected to the cathode 23 and to the grids 25 of a kinescope 40 for applying brightness and color representative signals thereto.

An output terminal of one of these circuits, the video detector, is coupled to a sync separator circuit 26. From the information provided to it, sync separator 26 derives the essential information which controls the timing of the horizontal and vertical deflection circuitry.

Sync separator 26 is coupled to a horizontal oscillator and AFPC circuit 27. The horizontal oscillator frequency is controlled by the horizontal sync pulses. Horizontal oscillator 27 is coupled to a horizontal deflection and high voltage circuit 28. The output of horizontal oscillator 27 provides timing pulses for the deflection generator and the scanning current provided by the amplifier 28 is coupled to a pair of horizontal deflection windings 30 of kinescope 40 through terminals X—X. The output current of horizontal deflection circuit 28 is the current which flows in horizontal deflection windings 30. A high voltage generating circuit included in circuit 28 is coupled to a final anode 38 of kinescope 40 and provides ultor voltage for kinescope 40. A signal representative of the horizontal retrace pulse is fed back from the deflection circuit 28 to an AFPC circuit in horizontal oscillator and AFPC circuit 27.

The sync separator 26 is also coupled to a digital vertical synchronization system 150. Sync separator 26 supplied composite sync signals to terminal A of system 150. Horizontal rate signals are supplied to terminal B of system 150 by the horizontal oscillator and AFPC circuit 27.

Digital vertical sync system 150, which can be constructed on an integrated circuit chip, replaces the conventional vertical oscillator in a television receiver providing vertical deflection sync pulses to the vertical deflection sawtooth generator in vertical deflection circuit 41. Additionally, system 150, which is synchronized in the embodiment shown in FIG. 1 by frequency doubled horizontal deflection signals provided by frequency doubler 100, provides internally generated vertical sync pulses in the absence of received vertical sync by the action of divide-by-525 counter 110, pulse shaper 130 and divide-by-525 reset circuit 120.

Low pass filter 50 serves to remove the high frequency components of incoming signals at point A. During the filtering of these high frequency components, some of the high frequency components of the vertical sync pulse are also lost. Peak detector 60 and comparator 70 serve to reconstruct the vertical sync pulse. In the event that noise pulses with broad pulsewidth, i.e., low frequency components similar to those of the vertical sync pulse, pass through low pass filter 50, peak detector 60 and comparator 70 and are reconstructed in the same manner as the vertical sync pulse, the width of such noise pulses will be compared with the known width of the vertical sync pulse in serial-to-parallel converter 85.

In the unlikely event that incoming noise pulses, after filtering in low pass filter 50 and reconstruction in peak detector 60 and comparator 70, have pulse width within the known range of pulsewidths of the vertical sync pulse, such noise pulses will cause resetting of the divide-by-525 counter 110 by action of the divide-by-525 reset circuit 120.

However, system 150 will still be prevented from malfunctioning by the operation of overscan limit control circuit 140. Circuit 140 senses when the amplitude of the voltage in vertical deflection yoke 34 is abnormal between vertical sync pulses i.e., when the divide-by-525 counter 110 is being reset at too great a frequency and thereby providing synchronizing pulses at too low a frequency, at which time the overscan limit control circuit 140 alone triggers pulse shaper circuit 130 to insure proper vertical deflection current in the vertical deflection yoke 34.

Terminal A is coupled through a low pass filter 50 to the positive terminal of a comparator 70. Terminal B is connected to the input terminal of a frequency doubler 100. An output terminal of an amplifier in low pass filter 50 is also coupled through a peak detector 60 to the negative terminal of comparator 70.

The output terminal of comparator 70 is connected to the input terminal of serial-to-parallel converter 85. A clock pulse input termial of serial-to-parallel converter 85 is supplied with clock rate pulses from the output terminal of frequency doubler 100.

The parallel output information terminals of converter 85 are coupled both directly and through two inverting input terminals to an and gate 90.

Frequency doubler 100 is also coupled to the input terminal of a divide-by-525 counter 110, the output terminal of which is coupled to the input terminal of a pulse shaper circuit 130 and to an input terminal of a divide-by-525 counter reset circuit 120. The output terminal of divide-by-525 counter reset circuit 120 is coupled to a reset input terminal of divide-by-525 counter 110.

An output terminal of pulse shaper circuit 130 is coupled to the input terminal, C, of a conventional vertical deflection circuit 41. Vertical deflection circuit 41 is coupled to a pair of vertical deflection windings 34 at output terminals Y—Y. Terminal D of vertical deflection circuit 41 is connected to an overscan limit control circuit 140 which monitors the vertical deflection voltage in windings 34. An output terminal of overscan limit control circuit 140 is connected to pulse shaper circuit 130. Circuits 10 through 41 operate in accordance with well-known principles.

Frequency doubler 100 receives horizontal frequency pulses from horizontal oscillator 27. Frequency doubler 100 provides at its output terminal approximately 31.5 Kilohertz clock frequency pulses for the divide-by-525 counter which divides these approximately 31.5 Kilohertz pulses down to approximately 60 Hertz vertical deflection frequency pulses at its output terminal. Thus a vertical deflection rate signal is derived from a horizontal deflection rate signal.

Frequency doubler 100 also provides clock rate signals to a clock input terminal of serial-to-parallel converter 85. This clock rate input signal allows converter 85 to sample, at the clock frequency, signals present at its other input terminal. And gate 90, which receives the information from converter 85, is activated by a 01111110 condition (the two end output signals being inverted to a logic 1 before they are passed to and gate 90). This condition occurs at the output terminals of serial-to-parallel converter 85 only when a pulse with substantially the same width, between 5 and 7 clock pulse periods or 0.159 milliseconds and 0.222 milliseconds, as the vertical deflection pulse is introduced at the non-clock input terminal of converter 85. And gate 90 thereby continuously monitors the sampled information in serial-to-parallel converter 85. And gate 90 thus discriminates among the signals which reach the non-clock input terminal of converter 85 by way of low pass filter 50, peak detector 60 and comparator 70 in favor of signals which have the width characteristic of the vertical sync pulse (i.e., between 0.159 milliseconds and 0.222 milliseconds). This discrimination allows further protection of the vertical deflection system from noise since it is unlikely that input noise signals will have pulse width between 0.159 milliseconds and 0.222 milliseconds to provide the proper sequential output from serial-to-parallel converter 85 to activate and gate 90 and produce a resetting pulse in the divide-by-525 reset circuit 120.

Figure 2:
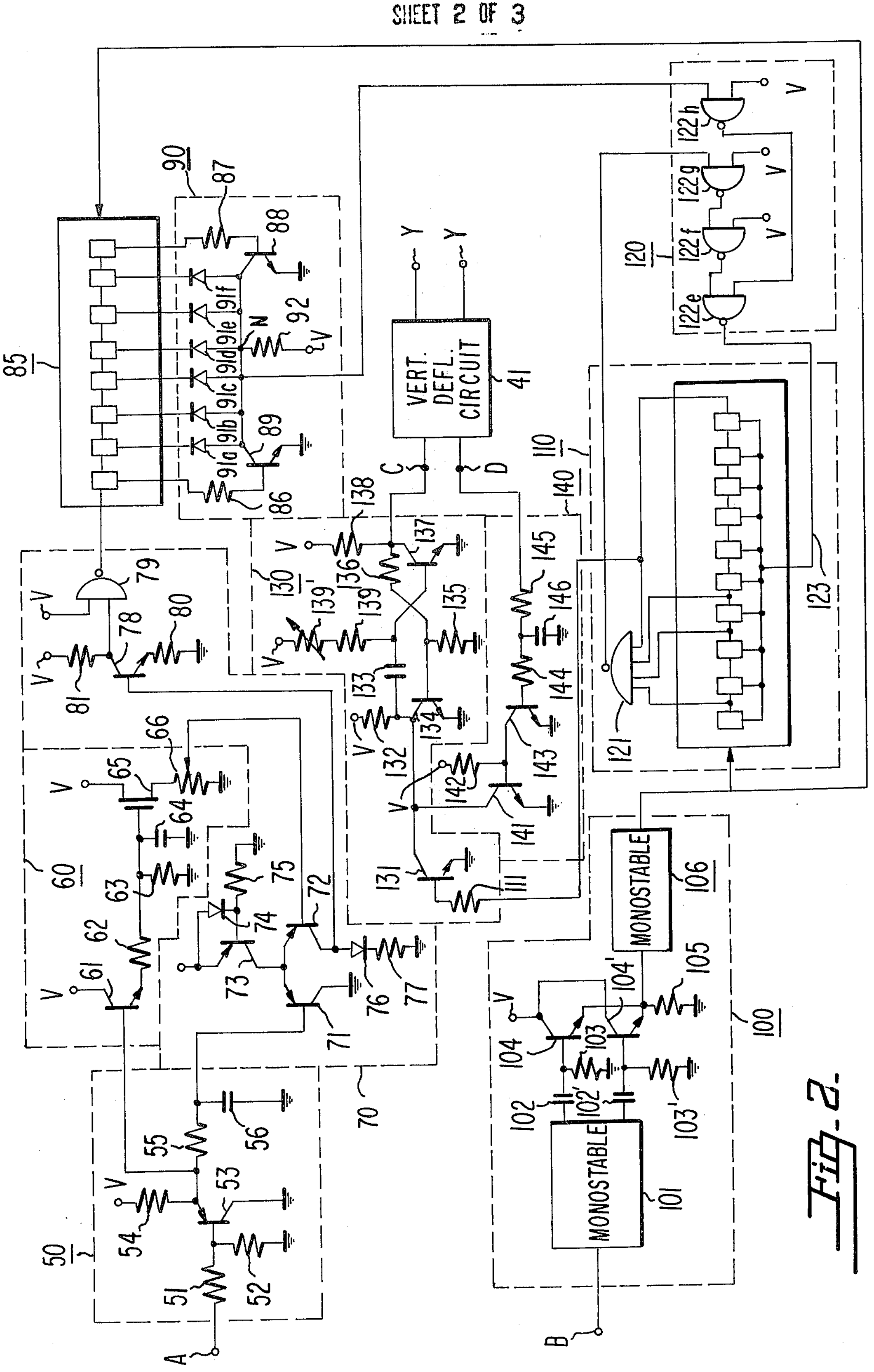
FIG. 2 is a partly block and partly schematic diagram of a portion of FIG. 1 embodying a synchronization system according to the present invention.

Referring now to FIG. 2 which shows an embodiment of digital vertical sync system 150, terminals A, B, C and D are connected within the television receiver as shown in FIG. 1.

Figure 3:
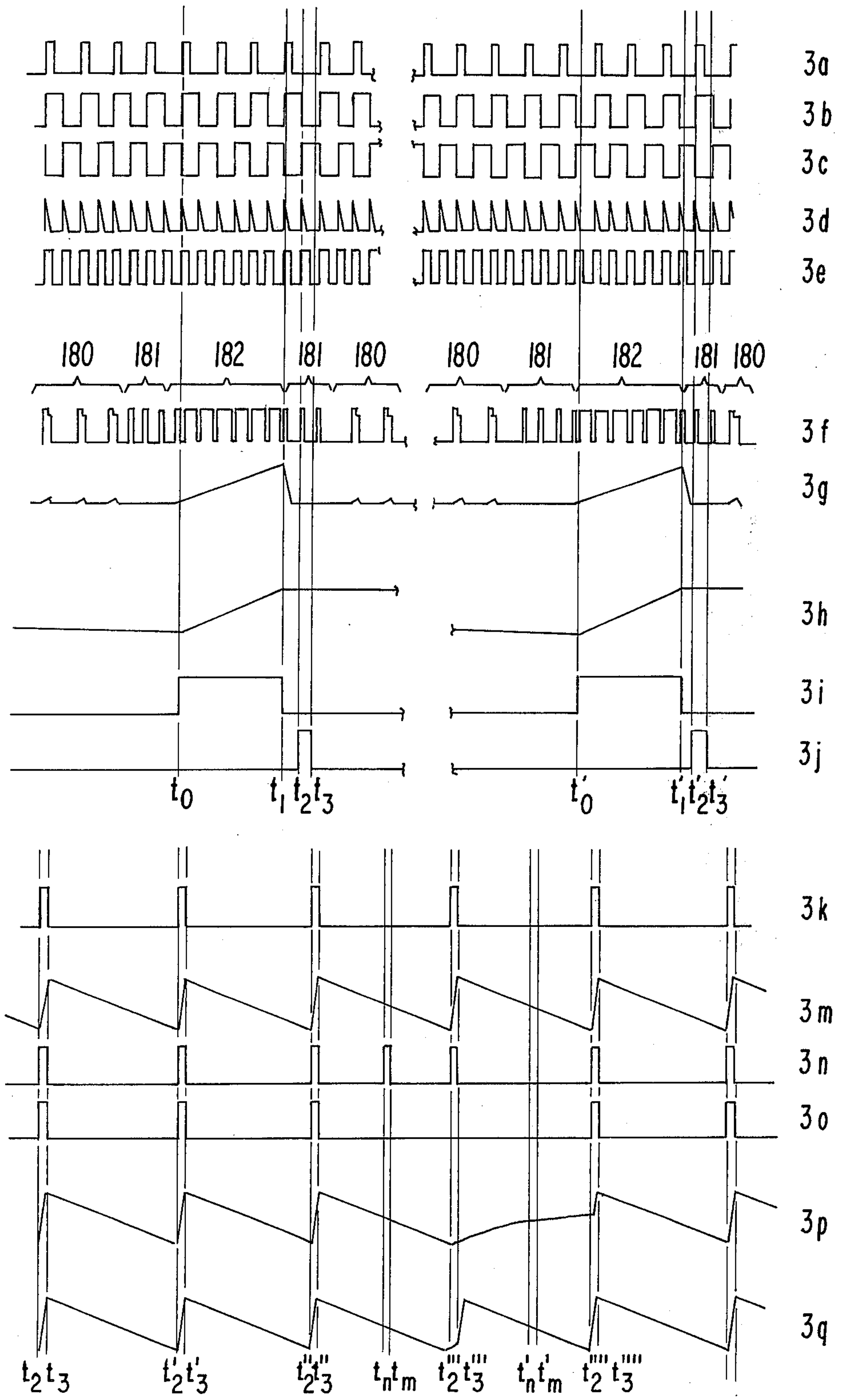
FIGS. 3*a* through 3*q* are illustrative waveforms achieved in the practice of the invention as illustrated in FIGS. 1 and 2.

Frequency doubler 100 consists of a monostable multivibrator 101 coupled to the source of 15.75 Kilohertz pulses. The input signal at point B is shown in waveform 3a of FIG. 3. One output terminal of multivibrator 101 is coupled to a differentiating circuit comprising serially coupled capacitor 102 and resistor 103 coupled between the output terminal and ground. The complementary output terminal of multivibrator 101 is coupled to an identical differentiating circuit comprising capacitor 102' and resistor 103'.

The junction of capacitor 102 and resistor 103 is connected to the base of a transistor 104. The junction of capacitor 102' and resistor 103' is connected to the base of a transistor 104'. The collectors of both transistors 104 and 104' are connected to a direct current voltage source V and the emitters of both are connected through a resistor 105 to ground.

The junction of the emitters of transistors 104 and 104' and resistor 105 is connected to the input terminal of a second monostable multivibrator 106. Multivibrator 106 is triggered by positive going pulses at the junction of 104, 104', and 105. The output signal from multivibrator 106 is a series of voltage pulses at twice the approximately 15.75 Kilohertz input frequency or about 31.5 Kilohertz.

The clock output obtained from multivibrator 106 is connected to a divide-by-525 circuit 110 consisting of ten serially coupled flip-flops. The reset lines of all ten flip-flops are coupled in parallel so that they can be simultaneously reset when a reset level occurs on a reset line 123. The output terminals of flip-flops 1, 3, 4 and 10 (corresponding to the binary representation of the divisor 525) are all connected to a nand gate 121. The output terminal of the tenth flip-flop is also coupled through a resistor 111 to the base of a driver transistor 131 in shaper circuit 130.

The output terminal of multivibrator 106 is also coupled to the clock input terminal of serial-to-parallel converter 85 which consists of two four-stage shift registers with the last stage of the first register coupled to the first stage of the second.

The output terminals of stages 1 and 8 are connected through current limiting resistors 86 and 87 respectively to the bases of inverting transistors 88 and 89. The emitters of transistors 88 and 89 are connected to ground. The collectors of transistors 88 and 89 are connected to a point N. The cathodes of six diodes 91*a–f* are also connected to point N and their anodes are connected , one each, to the output terminals of the remaining six stages of the shift register of converter 85. Point N is also connected through a resistor 92 to direct current voltage supply V. It can be seen that the configuration comprising transistors 88 and 89 and diodes 91*a–f f*coupled to the output terminals of serial-to-parallel converter 85 comprise an and gate which is activated only by a 01111110 condition on the shift register of converter 85. As previously stated, this condition, when shifted into the register at the clock frequency, represents the width of the vertical sync pulse.

The output of this and gate 90 is connected to one input terminal of a nand gate 122h of reset circuit 120. Reset circuit 120 comprises four nand gates. The other input terminal of gate 122*h* is connected to direct current voltage source V. The output terminal of gate 122*h* is coupled to an input terminal of a nand gate 122*e*, the output terminal of which is coupled to reset line 123. This connection allows a conductive condition in and gate 90 caused by a pulse with the width characteristic of vertical sync to reset the divide-by-525 counter 110.

A nand gate 122g of reset circuit 120 has one of its input terminals connected to the output terminal of nand gate 121. The other input terminal of gate 122*g* is coupled to direct current voltage supply V. The output of gate 122*g* is connected to an input terminal of another nand gate 122*f*. Another input terminal of gate 122*f* is connected to direct current voltage supply V. The output terminal of gate 122*f* is coupled to another input terminal of gate 122*e*. Gate 122*f* simply serves to invert the output of gate 122*g* to provide a proper input voltage level from the output terminal of gate 122*f* to an input terminal of gate 122*e*. As was previously mentioned, the output terminal of gate 122*e* is connected to reset line 123 of the divide-by-525 circuit 110.

Synchronizing information from sync separator 26 is introduced through terminal A and resistors 51 and 52 to the base of a transistor 53. Resistor 52 is coupled between the junction of resistor 51 and the base of transistor 53 and ground. The collector of transistor 53 is grounded and its emitter is coupled through current limiting resistor 54 to direct current voltage supply V. Its emitter is also serially connected through a low pass filter network comprising resistor 55 and capacitor 56 to ground. Elements 51 through 56 comprise low pass filter circuit 50. Circuit 50 amplifies signals present at terminal A and then removes the high frequency components of the amplified signals by virtue of the R-C circuit consisting of elements 55 and 56.

The emitter of transistor 53 is also connected to the base of a transistor 61, the collector of which is connected to the direct current voltage supply V. The emitter of transistor 61 is coupled through a voltage divider network consisting of a resistor 62 and a resistor 63 to ground. A capacitor 64 is coupled in parallel with resistor 63 between a terminal of resistor 62 and ground. This parallel R-C network of resistor 63 and capacitor 64 provides a long time constant for the gate electrode of a source-follower connected field effect transistor 65. The drain of transistor 65 is coupled to direct current voltage supply V and its source is connected through load potentiometer 66 to ground. Elements 61 through 66 comprise peak detector 60.

The junction of resistor 55 and capacitor 56 is coupled to the base of a transistor 71. The collector of transistor 71 is connected to ground. Its emitter is coupled to the emitter of a transistor 72. The base of transistor 72 is coupled to the variable arm of potentiometer 66. The collector of transistor 72 is coupled to the anode of a diode 76. The cathode of diode 76 is coupled through a resistor 77 to ground. Transistors 71 and 72 and their associated elements comprise a differential amplifier.

The junction of the emitters of transistor 71 and 72 is coupled to a constant current source comprising the collector of a transistor 73, the emitter of which is coupled to direct current voltage supply V and the base of which is coupled to the cathode of a diode 74. The anode of diode 74 is connected to the emitter of transistor 73. The cathode of diode 74 is also connected through a resistor 75 to ground.

The anode of diode 76 is connected to the base of a transistor 78. The collector of transistor 78 is connected through a resistor 81 to direct current voltage supply V. The emitter of transistor 78 is connected through a resistor 80 to ground. The collector of transistor 78 is also coupled to an input terminal of a nand gate 79. The other input terminal of nand gate 79 is coupled to direct current voltage supply V. The output terminal of nand gate 79 is connected to the input terminal of the serial-to-parallel converter 85. It is through this terminal that the information regarding the pulses that have passed through low pass filter 50, peak detector 60, and comparator 70 is shifted into serial-to-parallel converter 85 for a determination of whether or not the information passed through has the width characteristic of the vertical sync pulse. Elements 71 through 81 comprise comparator 70.

Peak detecting circuit 60 and comparator circuit 70 serve to reshape the vertical sync pulse which was filtered by capacitor 56 and resistor 55 back into a rectangular pulse thereby reconstructing the vertical sync pulse with substantially the same width that it had when it was introduced at terminal A.

It should be noted that the input voltage to peak detector 60 is unfiltered and thus contains all of the high frequency noise which is removed by capacitor 56 from the signal input to the base of transistor 71 in comparator 70. However, the noise which is amplified by transistor 61 is filtered in a long time constant circuit consisting of capacitor 64 and resistors 62 and 63.

As was previously mentioned, transistor 131 is the input transistor for pulse shaping circuit 130. Its base is connected through limiting resistor 111 to the last output line of divide-by-525 counter 110. The emitter of transistor 131 is connected to ground. Its collector is connected through resistor 132 to direct current voltage supply V. Its collector is also connected to one terminal of a capacitor 133 and to the collector of a transistor 134. The emitter of transistor 134 is connected to ground and its base is connected through resistor 135 to ground and through resistor 136 to point C, the output terminal of the digital vertical sync system 150 which is coupled to an input terminal of vertical deflection circuit 41.

The other terminal of capacitor 133 is coupled to the base of a transistor 137 and through a serially connected resistor 139 and a potentiometer 139' to direct current voltage supply V. The emitter of transistor 137 is connected to ground and its collector is connected through a resistor 138 to direct current voltage supply V. The collector of transistor 137 is also connected to point C, the output terminal of digital vertical sync circuit 150 to vertical deflection circuit 41. Elements 131 through 139', a monostable multivibrator, comprise pulse shaper circuit 130.

A feedback terminal D of vertical deflection circuit 41 is connected to one terminal of a current limiting resistor 145. The other terminal of resistor 145 is connected to a terminal of a capacitor 146 and a resistor 144. The other terminal of capacitor 146 is connected to ground. The remaining terminal of resistor 144 is connected to the base of a transistor 143. The emitter of transistor 143 is grounded and its collector is connected through a resistor 142 to direct current voltage supply V.

The collector of transistor 143 is also coupled to the base of a transistor 141. The emitter of transistor 141 is grounded. The collector of transistor 141, the output terminal of overscan limit control circuit 140, is connected to the collector of transistor 131. Elements 141 through 146 constitute overscan limit control circuit 140.

A horizontal oscillator or other suitable source provides approximately 15.75 Kilohertz clock pulses shown in FIG. 3*a* to input terminal B of vertical sync system 150. Terminal B is the input terminal of monostable multivibrator 101. The voltages at the two output terminals of monostable ultivibrator 101 are shown in FIGS. 3*b* and 3*c*. These output voltage signals are differentiated in differentiating circuits comprising capacitor 102 and resistor 103 and capacitor 102' and resistor 103' and the positive going spikes resulting from the differentiation are amplified in transistors 104 and 104' and appear across resistor 105 at the input terminal of monostable multivibrator 106. The input voltage waveform to monostable multivibrator 106 is shown in FIG. 3*d* and the output voltage waveform, approximately 31.5 Kilohertz clock pulses, is shown in FIG. 3*e*. The monostable multivibrators used in the circuit of FIG. 2 were RCA type CD4047's but any suitable monostable multivibrator or frequency doubler may be used to practice the invention.

These clock rate pulses are counted in divide-by-525 counter 110 which consists of ten serially coupled flip-flops. Output signals from the first, third, fourth, and last flip-flops which correspond to the binary representation of the divisor 525 are used to reset the flip-flops in a manner to be described later. The flip-flops used to construct divide-by-525 counter 110 shown in FIG. 2 were two RCA type CD4024AE integrated circuits. Any similar divide-by-525 scheme may be used.

The output terminals of the first, third, fourth and tenth flip-flops of counter 110 are coupled to a nand gate 121, the output signal of which drives one of two resetting circuits for counter 110. Note that the five hundred twelfth pulse which appears at the output terminal of the tenth flip-flop of each 525 pulse series is also the input signal for the shaping circuit 130 since the output of the tenth flip-flop is fed through resistor 111 to the base of transistor 131. There are other points in the circuit from which a drive pulse for shaping circuit 130 may be derived. For example, the output pulse of nand gate 121 may be inverted and coupled through resistor 111 to the base of transistor 131. Using such a scheme the five hundred twenty-fifth pulse of each 525 pulse series would be the input signal for shaping circuit 130.

It should be noted that as long as frequency doubler 100 is supplying operating signals to divide-by-525 counter 110, the vertical deflection circuitry will continue to function even in the absence of vertical sync because counting pulses from counter 110 will continue to be fed into shaping circuit 130 which will in turn transmit pulses to vertical deflection circuit 41.

The first resetting circuit for divide-by-525 counter 110 is composed of nand gate 121, previously mentioned, and nand gates 122*g*, 122*f*, and 122*e*. As connected, gates 122*g* and 122*f* function as inverting amplifiers. When the binary equivalent of 525 appears in counter 110, the output terminal of gate 121 goes to logic 0, is inverted to logic 1 at the output terminal of gate 122*g*, and is inverted to logic 0 again at the output terminal of gate 122*f*. The output signal from gate 122*f* drives nand gate 122*e* to put a logic 1 on the reset line 123 of divide-by-525 counter 110 at which time the divide-by-525 process begins again.

Vertical and horizontal sync pulses and equalizing pulses are coupled to terminal A from sync separator 26. These pulses are illustrated in FIG. 3*f*. Those portions of FIG. 3*f* labeled 180 are horizontal sync pulses with a frequency of approximately 15.75 Kilohertz. Those portions of FIG. 3*f f*labeled 181 are equalizing pulses with a frequency of approximately the clock frequency of 31.5 Kilohertz. Those portions of FIG. 3*f* labeled 182 are vertical sync pulses with a frequency of approximately 60 Hertz.

After being divided in voltage divider resistors 51 and 52, the signals of FIG. 3*f* are amplified in transistor 53 and filtered by the filter consisting of resistor 55 and capacitor 56. The filtered output signals are shown in FIG. 3*g*. Note that the equalizing pulse voltage has been completely filtered as has much of the horizontal sync signal voltage. However, the leading edge of the vertical sync pulse has also been filtered out.

To return the sharpness to the vertical sync signal, the unfiltered output of amplifier transistor 53 is coupled to a peak detector first amplifier transistor 61. The output of amplifier 61 is fed through current limiting resistor 62 to a long time constant R-C circuit consising of capacitor 64 and resistor 63. The voltage across this long time constant circuit is fed directly to the gate of source-follower field effect transistor 65. The output voltage from source-follower amplifier 65 is monitored across its load potentiometer 66. This voltage signals appears in FIG. 3*h*.

The output voltage from the low pass filter 50 and the output voltage from the peak detector 60 shown in FIGS. 3*g* and 3*h*, respectively, are then compared in a differential amplifier consisting of transistors 71 and 72. The low pass filter output signal is the input voltage for transistor 71 of the comparator and the signal supplied by the peak detector is the input voltage applied to the base of transistor 72. The configuration comprising transistor 73, diode 74, and resistor 75 connected in the emitter circuit of transistors 71 and 72 is a constant current source.

When the filtered vertical sync signal shown in FIG. 3*g* appears across capacitor 56, transistor 71 becomes less conductive, thus raising emitter voltage of transistors 71 and 72. This rise in the emitter voltage of transistor 71 and transistor 72 causes transistor 72 to conduct a current representation of the difference between its base voltage (which is the voltage of FIG. 3*h* sensed across a portion of potentiometer 66) and its emitter voltage which is similar to that shown in FIG. 3*g*.

The current thus flowing from the collector of transistor 72 into the load comprising diode 76 and resistor 77 in parallel with the base-emitter junction of transistor 78 and resistor 80 causes transistor 78 to turn on. The collector voltage of transistor 78 is then inverted in nand gate 79 to give the signal shown in FIG. 3*i*.

The output voltage signal of gate 79 is the input signal to serial-to-parallel converter 85. The input signala from the output terminal of gate 79 is sampled at the clock frequency, about 31.5 Kilohertz, which is supplied to a clock input of converter 85 from frequency doubler 100. The serial-to-parallel converter used in the construction of the circuit shown in FIG. 2 consisted of two four-bit shift registers with the output terminal of the last bit of the first register connected to the input terminal of the first bit of the second register.

The output voltages of the two end bits of serial-to-parallel converter 85 are passed through current limiting resistors 86 and 87 and coupled to inverting amplifiers consisting of transistors 88 and 89. When the end its are logic 0 transistors 88 and 89 are non-conductive and current supplied through resistor 92 from direct current voltage supply V does not flow through them to ground. When either or both of the end bits is logic 1, transistor 88 or 89 conducts current from voltage supply V to ground.

The remaining bits of the register are all connected to the cathodes of diodes 91*a* through 91*f*. If any one or more of the remaining bits contain a logic 0, the current supplied through resistor 92 will flow toward ground by virtue of the logic 0 condition on the cathodes of those one or more diodes. Should all of the remaining bits contain logic 1 then no current will flow through diodes 91*a* through 91*f* from the direct current supply V through resistor 92, and if transistors 89 and 88 are non-conductive then a logic 1 will exist at point N.

In this manner it may be seen that the structure comprising inverting amplifiers 88 and 89 and diodes 91*a* through 91*f* comprises an and gate which will cause a logic 1 to appear at point N only if the logic in the shift register of serial-to-parallel converter 85 reads 01111110. As was previously mentioned, this condition results when the output signal of gate 79 is sampled at the clock frequency and corresponds to the width of the vertical sync pulse. Thus a high degree of noise immunity is achieved using this scheme since the only noise pulse which will produce a logic 1 condition at point N is one having the width characteristic of the vertical sync pulse.

The second method for resetting divide-by-525 counter 110 utilizes the logic 1 condition occuring at point N when a vertical sync pulse is shifted into serial-to-parallel converter 85.

Nand gate 122h is connected as an inverting amplifier. When a logic 1 appears at point N, a logic 0 appears on the outer terminal of gate 122*h*. This logic 0 is coupled directly to nand gate 122*e* to induce a logic 1 condition on its output terminal and on reset line 123 causing divide-by-525 circuit 110 to reset.

As was stated before, pulse number 512 of each 525 clock pulse series being counted in circuit 110 causes an input logic 1 to appear on the base of transistor 131, rendering it conductive. The collector voltage of transistor 131 goes down. By this method the collector of transistor 131 provides a pulse to the input terminal of a monostable multivibrator consisting of elements 132 through 139′. This monostable multivibrator simply serves to shape this pulse to provide sufficient drive pulse width at its output terminal, point, C, to discharge a capacitor in the collector of a transistor (not shown) in vertical deflection circuit 41. This discharge initiates the retrace interval of the vertical deflection cycle. The drive pulse at point C is shown between time $t_2$ and $t_3$ of FIG. 3*k*. Several cycles of proper vertical deflection current waveforms produced by the vertical deflection circuit 41 are shown in FIG. 3*m*.

Terminal D receives signals from the vertical deflection circuit 41 and is coupled to a feedback protection circuit comprising elements 141 through 146. These elements comprise an overscan or low frequency limit control circuit 140. This circuit monitors the vertical deflection voltage to insure that pulses are introduced at the collector of transistor 131 if the deflection voltage is abnormally large.

In FIG. 3*n*, between time $t_n$ and $t_m$ a noise pulse having the width characteristic of the vertical sync pulse has occured during the vertical trace interval, time $t_3''$ to $t_2'''$, causing the divide-by-525 counter 110 to reset before a logic 1 condition has occured on the 512 count line connected to the base of transistor 131 through resistor 111. As a result, the next vertical sync pulse which occurs at time $t_2'''$ to $t_3'''$ of FIG. 3*n* also resets counter 110 before a retrace initiating pulse appears at the base of transistor 131. The missing retrace pulse can be noted in the pulse train of FIG. 3o. It is missing between time $t_2'''$ and $t_3'''$ of that figure.

In the absence of the overscan limit circuitry 141 through 146 the vertical deflection circuitry would be overdriven causing the vertical yoke current to collapse and possible damage the kinescope. This undesirable condition is shown for one vertical deflection cycle between time $t_2'''$ and $t_2''''$ in FIG. 3*p*.

This effect is prevented by the action of low frequency limit control circuit 140, the operation of which is described below.

The state of the vertical deflection cycle as represented by the monitored vertical deflection voltage waveform, is fed back to the base of transistor 143 through base protection resistor 144 and a noise protection circuit consisting of resistor 145 and capacitor 146. The collector of transistor 143 is direct coupled to the base of transistor 41. When a retrace initiating pulse should occur on the collector of transistor 131 and does not, the field in the vertical deflection windings (34 of FIG. 1) begins to collapse. This information is fed back to the base of transistor 143. Transistor 143 turns off, forcing transistor 141 into saturation and creating a retrace initiation pulse on its collector which is mounted to the same point as the collector of transistor 131, the input terminal of the monostable multivibrator of pulse shaper circuit 130. The vertical deflection cycle is immediately corrected as shown in FIG. 3q between time $t_3'''$ and $t_2''''$.

From the preceeding discussion, it can be seen that the potentially damaging effects of noise or interference which appears as vertical sync are eliminated when this system is used. In addition with complete loss of vertical sync information the vertical deflection system will operate at the proper vertical frequency. Further, this circuit eliminates the vertical hold control from the receiver.

What is claimed is:

1. A digital synchronizing system comprising:

a first source of synchronizing pulses;

a second source of synchronizing pulses which is subject to degradation;

resettable counting means coupled to said first source of synchronizing pulses for counting pulses generated in said first source of synchronizing pulses and for generating a first reset pulse upon the counting of a constant number of pulses from said first source of synchronizing pulses;

converting means coupled to said first source of synchronizing pulses and to said second source of synchronizing pulses for sampling the voltage level of pulses generted by said second source of synchronizing pulses at a rate determined by the rate of said first source of synchronizing pulses and for storing information representative of said sampled voltage level;

gating means coupled to said converting means for monitoring said stored information in said converting means and for generating a second reset pulse when said stored information corresponds to a pulse having time duration characteristics substantially equal to the time duration characteristics of pulse components from said second source of synchronizing pulses;

resetting means coupled to said gating means and to said resettable counting means for resetting said resettable counting means upon the incidence of either one or both of said first and second reset pulses; and a deflection circuit coupled to said resettable counting means, the operation of which is synchronized by the occurrence of a pulse generated in said resettable counting means.

2. A digital synchronizing system comprising:

a first source of synchronizing pulses;

a second source of synchronizing pulses which is subject ot degradation;

resettable counting means coupled to said first source of synchronizing pulses for counting pulses generated in said first source of synchronizing pulses and for generating a first reset pulse upon the counting of a constant number of pulses from said first source of synchronizing pulses;

converting means coupled to said first source of synchronizing pulses and to said second source of synchronizing pulses for sampling the voltage level of pulses generated by said second source of synchronizing pulses at a rate determined by the rate of said first source of synchronizing pulses and for storing information representative of said sampled voltage level;

gating means coupled to said converting means for monitoring said stored information in said converting means and for generating a second reset pulse when said stored information corresponds to a pulse having time duration characteristics substantially equal to the time duration characteristics of pulse components from said second source of synchronizing pulses;

resetting means coupled to said gating means and to said resettable counting means for resetting said resettable counting means upon the incidence of either one or both of said first and second reset pulses;

a deflection circuit coupled to said resettable counting means, the operation of which is synchronized by the occurrence of a pulse generated in said resettable counting means; and feedback means coupled to said deflection circuit and to said resettable counting means for sensing when said deflection circuit is not properly synchronized and for generating a pulse to insure the operation of said deflection circuit, thereby protecting said deflection circuit from malfunction.

3. A digital synchronizing system according to claim 2 wherein said resettable counting means comprises a serial combination of a plurality of flip-flops with a common resetting line, the output terminals of said flip-flops which sense the constant count being coupled to logic circuitry which produces an enabling pulse for resetting all of said flip-flops.

4. A digital synchronizing system according to claim 3 wherein:

said converting means comprises a serial-to-parallel converter consisting of a shift register.

5. A digital synchronizing system according to claim 4 wherein:

said gating means comprises a coincidence gate.

6. A digital synchronizing system according to claim 5 wherein:

said resetting means comprises at least one logic gate which induces a resetting level on the common resetting line of said resettable counting means upon the occurrence of the enabling pulse for resetting the flip-flops of said resettable counting means or upon the occurrence of a coincidence condition upon said coincidence gate.

7. In a television receiver, a digital deflection synchronizing system comprising:

a deflection generator and amplifier for producing deflection waveforms;

a deflection winding coupled to said deflection amplifier;

a source of clock synchronizing pulses;

a source of deflection rate synchronizing pulses;

resettable counting means coupled to said deflection amplifier and to said source of clock synchronizing pulses for counting a series of said clock synchronizing pulses and producing a deflection cycle synchronizing pulse for synchronizing said deflection amplifier;

converting means coupled to said source of deflection rate synchronizing pulses for sampling and storing information representative of said deflection rate synchronizing pulses at said clock synchronizing pulse rate;

gating means coupled to said converting means for passing information representative of said deflection rate synchronizing pulses; and resetting means coupled to said gating means and to said resettable counting means for resetting said resettable counting means upon energization by either or both of said gating means and said resettable counting means.

8. In a television receiver, a digital deflection synchronizing system comprising:

a deflection generator and amplifier for producing deflection waveforms;

a deflection winding coupled to said deflection amplifier;

a source of clock synchronizing pulses;

a source of deflection rate synchronizing pulses;

resettable counting means coupled to said deflection amplifier and to said source of clock synchronizing pulses for counting a series of said clock synchronizing pulses and for producing a deflection cycle synchronizing pulse for synchronizing said deflection amplifier;

converting means coupled to said source of deflection rate synchronizing pulses for sampling and storing information representative of said deflection rate synchronizing pulses at said clock synchronizing pulse rate;

gating means coupled to said converting means for passing information representative of said deflection rate synchronizing pulses;

resetting means coupled to said gating means and to said resettable counting means for resetting said resettable counting means upon energization by either or both of said gating means and said resettable counting means; and feedback means coupled to said deflection amplifier for sensing said deflection waveforms and for producing correcting signals for said deflection amplifier when said deflection amplifier is not synchronized by said deflection cycle synchronizing pulse.

9. A digital deflection synchronization system according to claim 8 wherein:

filtering means are coupled serially between said source of deflection rate synchronizing pulses and said converting means for filtering signals which do not have the width characteristic of said deflection rate synchronizing pulses which may be interposed among said deflection rate synchronizing pulses so that sampled information representative of said filtered signals does not pass through said gating means and said resetting means to reset said resettable counting means.

10. A digital deflection synchronization system according to claim 9 wherein:

a pulse shaping circuit comprising a monostable multivibrator is coupled between said resettable counting means and said deflection amplifier.

11. A digital deflection synchronization system according to claim 10 wherein said filtering means comprises:

a low pass filter circuit coupled to said source of deflection rate synchronizing pulses;

a peak detecting circuit for generating signals representative of the presence of said deflection rate synchronizing pulses by generating a rapid change in voltage level when said deflection rate synchronizing pulses are present which slowly decays over the period when said deflection rate synchronizing pulses are not present coupled to said source of deflection rate synchronizing pulses; and a comparing circuit coupled to between said low pass filter circuit and said detecting circuit and said converting means for comparing signals representative of output voltage from said low pass filter to signals representative of output voltage from said peak detecting circuit and generating difference input signals to said converting means when said deflection rate synchronizing pulses are present.

* * * * *

UNITED STATES PATENT OFFICE
CERTIFICATE OF CORRECTION

PATENT NO. : 3,878,335

DATED : April 15, 1975

INVENTOR(S) : Alvin Reuben Balaban

It is certified that error appears in the above-identified patent and that said Letters Patent are hereby corrected as shown below:

Column 5, line 24, that portion reading "fcoupled" should read -- coupled --. Column 6, line 67, after "through" insert -- current --. Column 7, line 46, that portion reading "ultivibrator" should read -- multivibrator --. Column 8, line 44, that portion reading "flabeled" should read -- labeled --. Column 8, line 61, that portion reading "consising" should read -- consisting --. Column 9, line 17, that portion reading "representation" should read -- representative --. Column 11, line 6, that portion reading "mounted" should read -- connected --. Column 11, line 33, that portion reading "generted" should read -- generated --. Column 11, line 58, that portion reading "ot" should read -- to --.

Signed and Sealed this

*twenty-third* Day of *September 1975*

[SEAL]

*Attest:*

RUTH C. MASON
*Attesting Officer*

C. MARSHALL DANN
*Commissioner of Patents and Trademarks*